Figure 1:
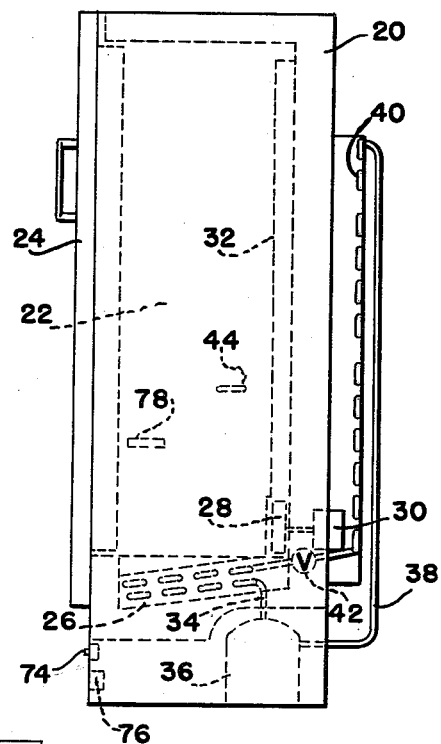

Oct. 1, 1963   R. E. GOULD   3,105,362
REFRIGERATING APPARATUS WITH INDICATING MEANS
Filed March 5, 1962

INVENTOR.
Richard E. Gould
BY
His Attorney

United States Patent Office 3,105,362
Patented Oct. 1, 1963

3,105,362
REFRIGERATING APPARATUS WITH
INDICATING MEANS
Richard E. Gould, Dayton, Ohio, assignor to General
Motors Corporation, Detroit, Mich., a corporation of
Delaware
Filed Mar. 5, 1962, Ser. No. 177,310
3 Claims. (Cl. 62—126)

This invention pertains to refrigerating apparatus and more particularly to warning devices for giving a warning in the event of failure of adequate refrigeration.

Food kept in refrigerators is valuable. Many families keep large supplies of frozen foods. In the event of an unnoticed failure of refrigeration large amounts of expensive foods may spoil or thaw or be unfit for human consumption. A large financial loss is thus involved. Battery-operated warning devices of various types have been tried but since batteries do not retain their charge indefinitely, the warning system will fail if batteries are not replaced frequently. Negligence in replacing such batteries can be expected to be common. Therefore, because of the possibilities of human failure, such a warning system is not fully reliable.

Warning lights have been provided which are energized by the same power supply as the refrigerator to indicate satisfactory temperature conditions. Failure of the light may indicate either that the light bulb or warning device has failed or that the power supply has failed, or that the cold temperature has not been maintained. Since such a warning light must operate continuously under normal circumstances, it is necessary that the current consumption be kept low thereby keeping low the light value. Consequently, the absence of such a light may be unnoticed. This is particularly true if the warning light is located in a place not often frequented or traversed. It is possible to use the same power supply for a more noticeable warning only in the event of a failure to maintain adequate temperatures. However, such a warning would not operate in the event of a blown fuse in the particular power circuit or a complete power failure and therefore would not provide an adequate warning under all circumstances.

It is an object of this invention to provide a warning of the failure of refrigeration which will be adequate under all circumstances.

It is another object of this invention to provide an audible warning device which will operate upon failure of refrigeration regardless of the blowing of any fuses or of the failure of the normal power supply.

It is another object of this invention to provide a warning system powered by a rechargeable battery which is recharged periodically coincidentally to a normal function of the refrigerator.

These and other objects are attained in the form shown in the drawings in which a freezer is provided with a thermostat responsive to the temperature in the storage compartment which is normally open as long as the temperatures remain below a predetermined safe temperature, such as 10° F. Should the temperature rise above 10° F., the thermostat will close thereby connecting a rechargeable battery in series with an audible warning device and a flashing light. The evaporating coil of the refrigerator is defrosted through a suitable timing device at periodic intervals. The rechargeable battery is connected to a recharging circuit which, in turn, is connected in parallel with the electric defrost heaters so that battery is recharged and maintained charged periodically coincidentally to the defrosting of the evaporator of the refrigerator.

Further objects and advantages of the present invention will be apparent from the following description, reference being had to the accompanying drawing wherein a preferred embodiment of the present invention is clearly shown.

Figure 2:
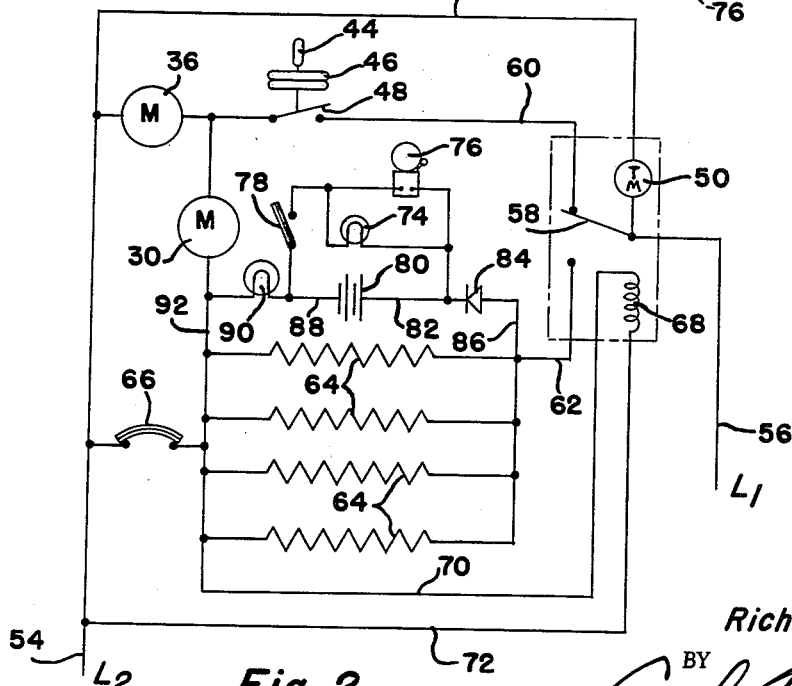

In the drawings:

FIGURE 1 is a view in elevation of a freezer embodying one form of my invention; and FIGURE 2 is a wiring diagram illustrating my invention as applied to the electrical circuits of the refrigerator shown in FIGURE 1.

Referring now to the drawings there is shown an insulated refrigerator cabinet 20 containing a freezing compartment 22 to be maintained at temperatures between 0° and 5° F. Access to the compartment is obtained through the door 24. The compartment is kept cool by a finned refrigerant evaporator 26 beneath the compartment 22. Air is drawn from the compartment 22 through the evaporator 26 by a fan 28 at the rear driven by the electric motor 30. The fan discharges the air upwardly through a duct 32 from which the air is returned to the compartment 22. The outlet of the refrigerant evaporator 26 is connected by a suction conduit 34 to the inlet of a sealed motor-compressor unit 36. The outlet of the motor-compressor unit 36 is connected by the conduit 38 to the top of the condenser 40 where the refrigerant is condensed and flows under the control of an expansion valve or a suitable capillary tube flow control device 42 to the inlet of the evaporator 26.

The motor-compressor unit 36 is controlled in accordance with the temperature of a thermostat bulb 44 which is operably connected to the operating bellows 46 of a switch 48 connected in series with motor-compressor unit 36 and the fan motor 30. The air from the compartment 22 gradually deposits frost upon the evaporator 26 thereby reducing its efficiency. A timer motor 50 is connected by the conductor 52 across the supply conductors 54 and 56. Periodically the timer motor 50 moves the movable switch contact 58 out of connection with the conductor 60 and into connection with the conductor 62. The conductor 62 connects to one terminal of the defrost heaters 64 which have their other terminal connected through the normally closed bimetal switch 66 to the second supply conductor 54. The electric heaters quickly melt the frost off of evaporator 26 and the thermostat 66 is set to open at a suitable above-freezing temperature such as 36° F. to discontinue the energization of the heater 64 at the termination of the defrosting. Shunted across the thermostatic switch 66 by the conductors 70 and 72 is an electromagnet operating coil 68 which is operably connected to the movable switch contact 58 to return the switch contact 58 to its normal upper position as shown in FIGURE 2. This terminates the defrosting operation and restores the refrigerator to normal operation with closing of the thermostatic switch 48 to resume operation of the sealed motor-compressor unit 36 and the fan motor 30.

To provide warning which will incite attention in the event that there is a failure of refrigeration in the compartment 22, I provide beneath the door 24 a light 74 which when energized flashes brightly. In addition, I also provide an audible warning device such as a bell 76 or a suitable buzzer which may operate either continuously or intermittently when energized. The flashing light 74 and the bell 76 may be connected in parallel with each other and in series with a normally open thermostat 78 which may be of a bimetal type and located in or adjacent the compartment 22 and set to close at a temperature of 10° F. and which is open at lower temperatures. The closing of the thermostat 78 will effectively connect the flashing light 74 and the bell 76 effectively across the terminals of a rechargeable battery 80 formed of hermetically sealed nickel cadmium cells of a desired number. To maintain the battery 80 charged at all times I connect the terminal conductor 82 through a selenium rectifier 84 and the conductor 86 to the conductor 62. The terminal conductor 88 of the battery 80 is connected through the lamp 90 to the conductor 92 which connects through the normally closed thermostat 66 to the supply conductor 54.

With this arrangement, during each defrost period the current will flow from the supply conductor 56 through the movable contact 58 through the conductors 62, 86 and the rectifier 84 and through the conductor 82 to the battery 80 from which current will flow through the conductor 88, the lamp 90, the conductor 92 and the thermostat 66 to the supply conductor 54. This current will flow through this circuit during each defrosting period to recharge the battery 80 and to maintain the battery 80 fully charged. If the temperature of the compartment 22 should rise above 10° F. for any reason whatsoever, the switch 78 will close thereby energizing both the flashing light 74 and the bell 76 to provide both an attention attracting audible and visible indication of the failure of refrigeration. Thus, a warning is provided which can be effective even if the person is blind or deaf. Even if the power supply should fail, the warning would be made as long as there is any charge in the battery 80. Through such a device as this, the trouble may be properly corrected so that the food stored in the cabinet 20 will not be permitted to thaw or spoil thereby avoiding a large loss in the event of failure of adequate refrigeration.

With the above warning system, during the initial operation of the apparatus as well as immediately after the loading of the compartment 22 with a large warm load of food, the warning signals 74 and 76 will operate for a long period of time until the temperature of the compartment 22 is lowered below 10° F. To prevent this, the thermostatic switches 44, 46, 48 and 78 may be combined in a control such as is shown in the Stickel Patent 2,537,431, issued January 9, 1951, in which the alarm can be manually shut off for one running cycle only of the motor compressor unit or as shown in the Jacobs Patent 2,755,362, issued July 17, 1956, in which the alarm is automatically shut off as soon as the temperature in the compartment 22 begins to fall.

While the embodiment of the present invention as herein disclosed constitutes a preferred form, it is to be understood that other forms might be adopted.

What is claimed is as follows:

1. Refrigerating apparatus including an insulated cabinet containing a compartment to be cooled, refrigerant evaporating means normally operating at below water freezing temperatures associated with said compartment for cooling said compartment and incidentally accumulating frost therefrom, electrically operated refrigerant liquefying means operably connected to said evaporating means, electrical control means for controlling said liquefying means to maintain said evaporating means normally below water freezing temperatures, electrically controlled means for defrosting said evaporating means, a rechargeable battery, a thermostatic switch responsive to the temperature of said compartment and operated to closed position in response to a predetermined high temperature of said compartment to be cooled, electrical warning means, conductor means electrically connecting said battery and said thermostatic switch and said warning means in series circuit, electrical supply conductor means operably connected to said liquefying means under the control of said control means and to said electrically controlled defrosting means, battery recharging means including a rectifier operably connected to said battery, and means coincidental to the defrosting of said evaporating means for energizing said recharging means.

2. Refrigerating apparatus including an insulated cabinet containing a compartment to be cooled, refrigerant evaporating means normally operating at below water freezing temperatures associated with said compartment for cooling said compartment and incidentally accumulating frost therefrom, electrically operated refrigerant liquefying means operably connected to said evaporating means, electrical control means for controlling said liquefying means to maintain said evaporating means normally below water freezing temperatures, electrically controlled means for defrosting said evaporating means, a rechargeable battery, a thermostatic switch responsive to the temperature of said compartment and operated to closed position in response to a predetermined high temperature of said compartment to be cooled, electrical warning means, conductor means electrically connecting said battery and said thermostatic switch and said warning means in series circuit, electrical supply conductor means operably connected to said liquefying means under the control of said control means and to said electrically controlled defrosting means, battery recharging means including a rectifier operably connected to said battery, and conductor means for connecting said recharging means in parallel electrical circuit with said electrically controlled defrosting means.

3. Refrigerating apparatus including an insulated cabinet containing a compartment to be cooled, refrigerant evaporating means normally operating at below water freezing temperatures associated with said compartment for cooling said compartment and incidentally accumulating frost therefrom, electrically operated refrigerant liquefying means operably connected to said evaporating means, electrical control means for controlling said liquefying means to maintain said evaporating means normally below water freezing temperatures, electrically controlled means for defrosting said evaporating means, a rechargeable battery, a thermostatic switch responsive to the temperature of said compartment and operated to closed position in response to a predetermined high temperature of said compartment to be cooled, electrical warning means, conductor means electrically connecting said battery and said thermostatic switch and said warning means in series circuit, electrical supply conductor means operably connected to said liquefying means under the control of said control means and to said electrically controlled defrosting means, battery recharging means including a rectifier operably connected to said battery, conductor means for connecting said recharging means in parallel electrical circuit with said electrically controlled defrosting means and periodic means for periodically energizing said electrically controlled defrosting means.

References Cited in the file of this patent

UNITED STATES PATENTS

| | | |
|---|---|---|
| 2,253,657 | Smith | Aug. 26, 1941 |
| 2,385,525 | McCloy | Sept. 25, 1945 |
| 3,028,586 | Reda | Apr. 3, 1962 |